Aug. 11, 1953    W. R. AYRES ET AL    2,648,829
CODE RECOGNITION SYSTEM
Filed June 21, 1952
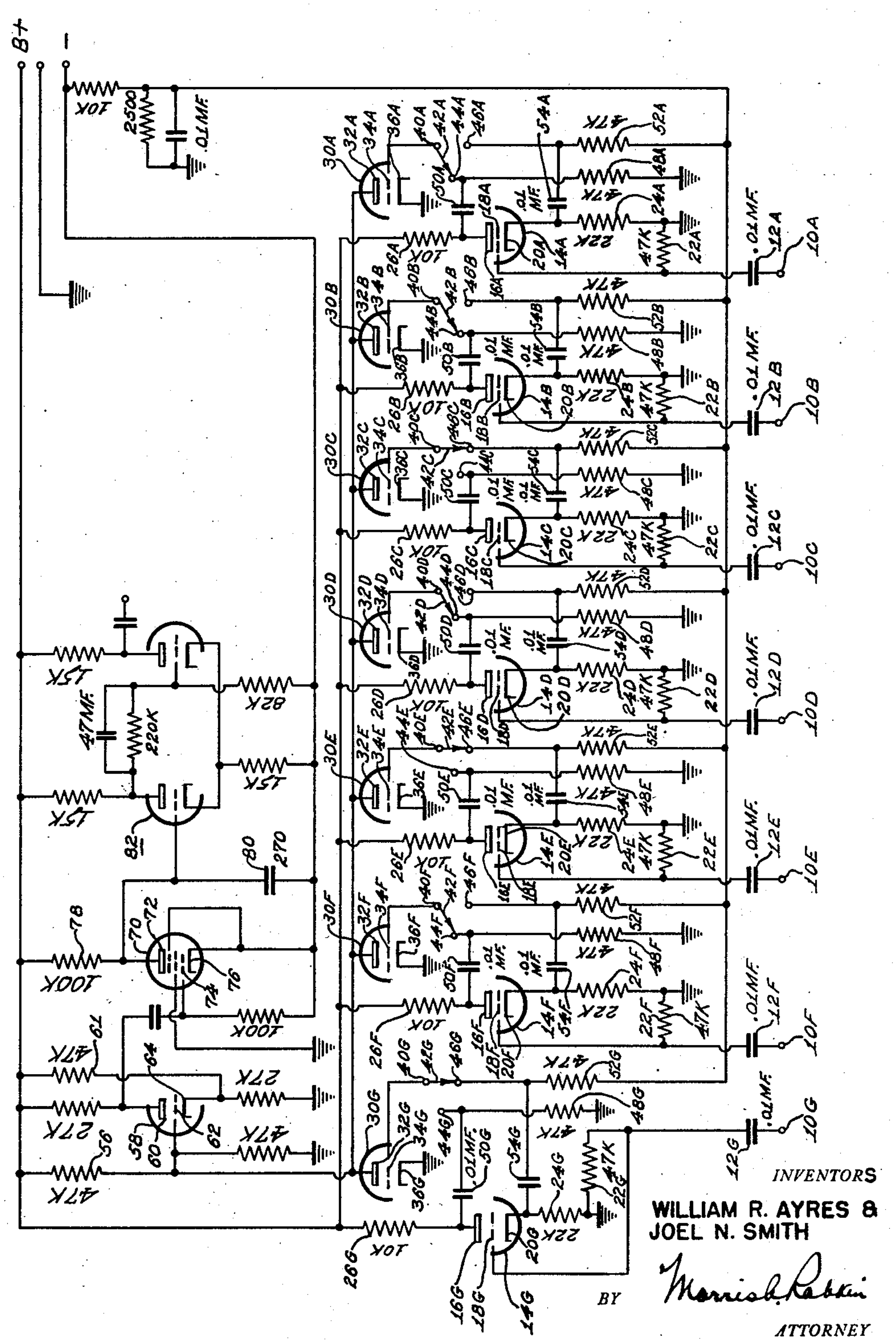
INVENTORS
WILLIAM R. AYRES &
JOEL N. SMITH
BY Morris L. Rabkin
ATTORNEY Patented Aug. 11, 1953

2,648,829

UNITED STATES PATENT OFFICE 2,648,829

CODE RECOGNITION SYSTEM

William R. Ayres, Camden, and Joel N. Smith, Westmont, N. J., assignors to Radio Corporation of America, a corporation of Delaware Application June 21, 1952, Serial No. 294,864

9 Claims. (Cl. 340—147)

This invention relates to electrical code systems and more particularly to a system for code recognition.

Presently known information handling machines and computers of the digital type usually change information which is being supplied to the machine from the form in which it is customarily handled, namely, the alphabetic and/or numeric, to a code which may be more conveniently handled by the machine. The code presently preferred is the binary code. Accordingly, information being supplied to a machine of the type indicated is usually encoded in a binary form before being processed by the machine.

There are many operations by an information handling machine which for initiation require the recognition of a "keying" or instruction code. This may be an instruction to commence a mathematical operation, read out information from certain portions of a memory, or stop an operation when a certain code occurs. The apparatus for such code recognition may be termed a code recognition gate. In essence it is a gate circuit which provides an output indication in response to the application of the code which the gate is preset to recognize.

It is an object of this invention to provide a novel code recognition gate.

It is a further object of this invention to provide a simple code recognition gate.

It is still a further object of the present invention to provide a useful code recognition gate for a parallel presented binary code.

These and further objects of the present invention are achieved by providing a first set of tubes, one for each of the binary code positions, to the grids of which the binary code to be recognized is presented. A second set of tubes have a common anode load to which their anodes are connected. The grid of each of these second set of tubes may be connected either to a cut off bias terminal or to a conducting bias potential terminal. If one of these positions is designated as "1" and the other as "0," a means is provided for setting into the code recognition gate the code to be recognized. When each of the first set of tubes is made conductive, outputs therefrom are connected to a different one of the conducting bias terminals to override the bias and apply a cutoff bias and to a different one of the cutoff bias terminals to override the bias and apply a conductive bias. A first detector, which is connected to the common anode load, provides an output when all the second set of tubes simultaneously become non-conductive. A second detector consists of an integrating network followed by a trigger circuit. The coincidence of non-conduction must exist for a time required to charge up the integrating network before the trigger circuit is triggered to provide a code recognition output signal. When the code signals, which are equivalent to the code set into the recognition gate, are applied to the first set of tubes, those tubes of the first set are made conductive to which binary "1" representative signals are applied. The remaining tubes are not made conductive. The second set of tubes which are connected to the conductive bias terminals to which the conductive tubes of the first set are connected are rendered non-conductive. Since the remaining tubes of the second set are connected to a cutoff bias, the first and second detectors will be actuated. If code signals which are not set into the recognition gate are applied thereto, the second set of tubes will not be simultaneously non-conductive and therefore no output recognition signal will occur.

The novel features of the invention as well as the invention itself, both as to its organization and method of operation, will best be understood from the following description, when read in connection with the accompanying drawing, which is a circuit diagram of an embodiment of the invention.

The embodiment of the invention shown in the circuit diagram is a code recognition gate for a seven binary digit code. The code is presented to the code recognition gate in parallel form, namely, the seven digits are presented simultaneously to seven input terminals 10A through 10G.

Each terminal of the code recognition gate is connected through a condenser 12A through 12G to the grid 18A–18G, of one of a first plurality of vacuum tubes 14A–14G. A grid leak resistor 22A–22G is provided for each tube and a cathode bias resistor 24A–24G is connected between the cathode 20A–20G of each tube and ground. The value of the cathode bias plus the value of an anode load resistor 26A–26G is selected so that each of the tubes in this first set is normally biased substantially to cutoff.

A second set of tubes 30A–30G is provided, one for each of the first set of tubes 14A–14G. The cathode 36A–36G of each of this second set of tubes is connected to a selecting switch 40A–40G which has a selector arm 42A–42G and two contact positions 44A–44G, 46A–46G. The first of these contact positions 44A–44G is connected to ground through a resistor 48A–48G and also to the anode 16A–16G of the associated tube in the first set through a condenser 50A–50G. The second 46A–46G of these contact positions is connected through another resistor 52A–52G to a source of negative bias (not shown) and also through a condenser 54A–54G to the cathode of the associated tube in the first set of tubes. If it is assumed that the contact 46A–46G connected to the negative bias, which is of a value to cut off a tube, represents a "0," and the contact 44A–44G which is coupled to the anode 16A–16G of the tube in the first set represents a "1," then there is provided a system whereby each of the selector arms 42A–42G may be set in a position to provide recognition for a desired code.

Each one of the anodes 30A–30G of the tubes in the second set is connected to a common anode load resistor 56. If a tube 30A–30G in the second set is connected to the "0" contact terminal 46A–46G, the tube is maintained substantially biased off. If it is connected to the "1" contact terminal 44A–44G, the tube is maintained substantially conductive. The application of a positive pulse corresponding to the binary digit "1," renders a particular tube in the first set to which it is applied conducting. The potential at the anode of the first set tube decreases and the potential at its cathode increases. An associated second set tube 30A–30G which is connected to this first tube anode through a "1" contact terminal is cut off by the decrease in anode potential of the first set tube. Accordingly, those of the tubes in the second set which are connected to the anodes of tubes in the first set to which "1" pulses are applied will be cut off. The remaining tubes in the second set which are connected to the "0" contact terminals, and where a "0" exists in that code position, will remain cut off. Accordingly, all the second set of tubes are cut off simultaneously and the potential at the point of connection to the common anode load 56 rises in value to substantially that of the plate supply for these tubes.

Should any one of the second set of tubes be connected to the "0" contact position and should a "1" be applied to that binary digit position instead of a "0," the increased potential at the cathode of the associated tube in the first set will overcome the cut-off bias and render that second set tube conducting. Accordingly, all the second set of tubes are cut off only when the code for which the selector switches are set is applied to all the input terminals.

The code recognition gate as shown in the drawing is set to recognize 0101011. When all the tubes in the second set of tubes are cut off, an amplifier tube 58, which otherwise is maintained non-conducting and which has its grid 62 connected to the common anode load 56, is made to conduct. The amplifier tube 58 is maintained cut off in order that no false output be provided for less than all the second set of tubes becoming cut off. The tube provides an amplitude discriminating type of action, since it is not rendered conductive until its grid rises up to a voltage level sufficient to overcome the bias applied to its cathode by a voltage divider 61. The conduction of the amplifier tube 58 decreases the potential at its anode 60. This potential drop is applied through a coupling condenser to the grid of a second tube 70. This tube has an anode load resistor 78 connecting its anode 72 to B+, and a condenser 80 connecting its anode to ground. The cathode 76 of this tube is also connected to ground. Normally, this tube is conducting and hence the condenser 80 connected across it is kept in essentially a discharged condition. As soon as a negative voltage from the anode of the first amplifier 60 is applied to the grid 74 of this tube, the tube becomes cut off and the voltage across the condenser 80 rises. When this voltage reaches a certain predetermined level, a Schmitt trigger circuit 82 which is connected thereto is triggered and a code recognition pulse signal is provided as an output. The Schmitt trigger circuit is one wherein there are two stable conditions. A voltage having a certain minimum value is required to drive it from one to the other condition. It will stay in that condition, however, until the applied voltage is removed or dropped below another value, at which time it returns to its initial condition. The operation of a Schmitt trigger circuit is well known in the art, and is described in O. S. Puckle, "Time Bases" (1st edition), pages 57–59, John Wiley and Sons, New York.

The reason for using an integrating circuit which is essentially what the circuit consisting of the second tube 70 with the condenser 80 thereacross amounts to, is that pulses comprising a given code may not all start together at a binary position, and may not have identical durations, nor will they necessarily end together. Accordingly, some means must be included to prevent errors due to enabling pulses (caused by one-digit pulses occurring in these digit positions for which the particular tubes in the second set are connected to the "1" contact) starting slightly ahead of inhibiting pulses (due to one-digit pulses occurring in those digit positions for which the tubes in the second set are connected to the "0" contact).

Another situation which may cause difficulty is one in which these inhibiting pulses terminate while enabling pulses in the "1" channels are still present. To overcome this situation, the "1" pulses are given an essentially fixed width, and the integrating circuit is provided to require a coincidence of all the second set of tubes for a predetermined duration, before a voltage sufficient to trip the trigger circuit is provided. This duration is the time it takes for the condenser in the integrating circuit to charge up to the triggering potential. Upon termination of coincidence the integrating condenser 80 discharges through its associated tube, thereupon permitting the Schmitt triggering circuit 82 to return to its original condition of stability.

Accordingly, it may be seen that an input code which is not the code for which the selector arms of the switches are set will, in the case of unwanted "0's," not change the conducting conditions of any of the first set of tubes and thereby leave the second set of tubes associated therewith unaffected. Unwanted "1's," in changing the conducting condition of the first set of tubes to which they are applied, have the effect of rendering conducting the corresponding tubes in the second set associated therewith which are set to recognize "0's." Thus erroneous recognitions are prevented. It is only when the code, which is applied to the input terminals, is the code for which the selecting switches are preset that all of the tubes in the second set are cut off simultaneously, thus providing an output code recognition signal. It is to be noted that this code recognition gate can be made to recognize all seven binary digit codes except those wherein the binary digits are all "0's." This is, however, a trivial case and is rarely, if ever, used.

For the purposes of showing an operative embodiment and not to be construed as a limitation on the invention, the values of the resistors and condensers as well as the tube types used are shown on the circuit diagram. The above description assumes that the coded "1's" are represented by pulses which render the first set of tubes conducting and the coded "0's" do not. It is entirely in accordance with the teachings of this invention to reverse this significance and represent a "0" as a positive pulse and a "1" either as the absence of a pulse or as a negative pulse.

There has, accordingly, been described above a novel, simple and useful code recognition gate. The code recognition output of this gate is provided to enable subsequent apparatus to function responsive to the presentation of the code for which the recognition gate is preset.

What is claimed is:

1. A binary digit code recognition system comprising a first plurality of input terminals, means to apply electrical signals representative of the binary digits of a code to be recognized to said input terminals, a first means for each input terminal to generate a first and a second output responsive to the application of one of said binary digit representative signals, each of said first means being coupled to a different one of said input terminals, a plurality of second means having a first condition responsive to said first of said outputs and a second condition responsive to said second of said outputs, means to couple selected ones of said plurality of second means to derive first outputs from selected ones of said first means and to couple remaining ones of said second means to derive second outputs from remaining ones of said first means, means to bias said remaining ones of said second means to said first condition in the absence of said second outputs, and means to provide a code recognition output responsive to all said second means simultaneously achieving said first condition.

2. A binary digit code recognition system comprising a plurality of input terminals to which signals representing said code are applied, one of said terminals being provided for each digit position in said code, a plurality of electron discharge tubes, one for each digit position in said code, a first means for each digit position in said code to generate a tube cut-off pulse and a tube conductive pulse responsive to the application of one of two digit representative signals, a plurality of first and second terminals, means coupling each of said first terminals to a different one of said first means to derive said cut-off pulse output, means coupling each of said second terminals to a different one of said second means to derive said conductive pulse output, means to apply a tube cut off bias to each of said second terminals in the absence of output from said first means, means to selectively couple each of said plurality of tubes to a different one of said first or said second terminals in accordance with the code desired to be recognized, and means to provide a code recognition output signal responsive to all said tubes simultaneously being cut off.

3. A binary digit code recognition system as recited in claim 2 wherein each of said first means includes an electron discharge tube having anode, cathode and control grid electrodes, an anode load resistor connected to the anode of said tube, and a cathode load resistor connected to the cathode of said tube, said tube conductive pulse being generated at said cathode and said tube cut off pulse being generated at said anode.

4. A binary digit code recognition system as recited in claim 2 wherein said means to provide a code recognition signal responsive to all said tubes being simultaneously cut off includes an integrating circuit, means to permit said integrating circuit to charge up with voltage responsive to all said tubes being simultaneously cut off, and means to provide an output signal responsive to said integrating circuit becoming charged above a predetermined voltage value.

5. A binary digit code recognition system comprising a plurality of input terminals, one for each digit position in said code, a plurality of electron discharge tubes each having an anode, cathode and control grid, a first and second bias terminal for each of said tubes, means to apply a tube conductive bias to each of said first terminals, means to apply a tube cut-off bias to each of said second terminals, means to couple each of said tubes to one of said first and second bias terminals in accordance with the code desired to be recognized, a plurality of means coupled between each of said input terminals and said first and second bias terminals to render each of said tubes coupled to said first bias terminals non-conducting and each of said tubes coupled to said second bias terminals conducting responsive to one of the digits in each binary position in said code, means coupled to all said tubes to detect a coincidence in their non-conduction, and means to provide a code recognition signal output responsive to the maintenance of said detected coincidence in excess of a predetermined minimum interval.

6. A binary digit code recognition system as recited in claim 5 wherein each of said plurality of means to overcome said first and second bias means comprises an electron discharge tube having an anode, a cathode and a control grid, an anode load resistor connected to said tube anode, a cathode load resistor connected to said tube cathode, means coupling said tube anode to said first bias terminal, and means coupling said tube cathode to said second bias terminal.

7. A binary digit code recognition system comprising a plurality of input terminals, one for each binary digit position in said code, a plurality of first electron discharge tubes each having an anode, a control grid and a cathode, each of said control grids being coupled to a different one of said input terminals, a plurality of second electron discharge tubes each having an anode, cathode and grid, a common anode load to which all of the anodes of said plurality of second tubes are connected, a plurality of selector switches each having a selector arm and a first and a second contact, each of said selector arms being connected to the control grid of a different one of said second tubes, each of said first contacts being coupled to the anode of a different one of said first tubes, each of said second contacts being coupled to the cathode of a different one of said first tubes, a plurality of resistors, each of said resistors connecting each first contact with the cathode of a different one of said plurality of second tubes, means to apply a tube non-conductive bias to each of said second contacts, means to position each said selector switch on said first contact to recognize one binary digit and on said second contact to recognize the opposite binary digit, means connected to said common anode load to detect a coincidence in the non-conducting condition of all said second tubes and means to provide a code recognition output responsive to the maintenance of said detected coincidence in excess of a desired interval.

8. A binary digit code recognition system as recited in claim 7 wherein said means to detect a coincidence in the non-conducting condition of all said second tubes includes an electron discharge tube having anode, cathode and grid electrodes, means coupling said grid electrode to said common anode load, means coupling said anode to said means to provide a code recognition output, and means to bias said tube to be non-conducting below the level of potential reached by said common anode load when all said second tubes are cut off.

9. A binary digit code recognition system as recited in claim 7 wherein said means to provide a code recognition output includes an integrating network, and a trigger circuit connected to the output of said integrating network to be responsive to an output therefrom.

WILLIAM R. AYRES.
JOEL N. SMITH.

References Cited in the file of this patent

UNITED STATES PATENTS

| Number | Name | Date |
|---|---|---|
| 2,540,654 | Cohen | Feb. 6, 1951 |
| 2,549,071 | Dusek | Apr. 17, 1951 |
| 2,609,439 | Marshall | Sept. 2, 1952 |
| 2,611,813 | Sharpless | Sept. 23, 1952 |